(12) United States Patent
Moriguchi et al.

(10) Patent No.: US 10,759,945 B2
(45) Date of Patent: Sep. 1, 2020

(54) ANTI-ADHESIVE COMPOSITION FOR UNVULCANIZED RUBBER

(71) Applicant: LION SPECIALTY CHEMICALS CO., LTD., Tokyo (JP)

(72) Inventors: Eiji Moriguchi, Tokyo (JP); Mai Murakami, Tokyo (JP)

(73) Assignee: LION SPECIALTY CHEMICALS CO., LTD., Tokyo (JP)

( * ) Notice: Subject to any disclaimer, the term of this patent is extended or adjusted under 35 U.S.C. 154(b) by 33 days.

(21) Appl. No.: 16/264,695

(22) Filed: Feb. 1, 2019

(65) Prior Publication Data

US 2019/0161624 A1 May 30, 2019

Related U.S. Application Data

(63) Continuation of application No. PCT/JP2017/028741, filed on Aug. 8, 2017.

(30) Foreign Application Priority Data

Aug. 9, 2016 (JP) .................................. 2016-156833

(51) Int. Cl.

| | | |
|---|---|---|
| C08C 4/00 | (2006.01) | |
| C09D 5/00 | (2006.01) | |
| C08L 29/04 | (2006.01) | |
| C08L 101/14 | (2006.01) | |
| C08L 101/00 | (2006.01) | |
| C08L 1/28 | (2006.01) | |
| C09K 3/22 | (2006.01) | |
| C08J 7/04 | (2020.01) | |
| C09D 101/28 | (2006.01) | |
| C09D 129/04 | (2006.01) | |

(52) U.S. Cl.
CPC .................. C09D 5/00 (2013.01); C08C 4/00 (2013.01); C08J 7/0427 (2020.01); C08L 1/286 (2013.01); C08L 29/04 (2013.01); C08L 101/00 (2013.01); C08L 101/14 (2013.01); C09D 101/286 (2013.01); C09D 129/04 (2013.01); C09K 3/22 (2013.01); C08J 2321/00 (2013.01); C08J 2400/14 (2013.01)

(58) Field of Classification Search
CPC ...................................................... C08C 4/00
See application file for complete search history.

(56) References Cited

U.S. PATENT DOCUMENTS

3,765,911 A * 10/1973 Knowles ............. B29C 37/0067
106/2
3,990,990 A * 11/1976 Kojima ...................... C08J 7/12
252/382
4,306,994 A * 12/1981 Ellslager ............. B29C 37/0075
106/287.17

FOREIGN PATENT DOCUMENTS

| JP | S50149770 | 12/1975 |
| JP | S6232127 | 2/1987 |
| JP | 2001348495 | 12/2001 |
| JP | 2009084489 | 4/2009 |
| JP | 2009161667 | 7/2009 |
| JP | 2010247864 | 11/2010 |
| JP | 2013001720 | 1/2013 |
| JP | 2014095010 | 5/2014 |

OTHER PUBLICATIONS

"International Search Report (Form PCT/ISA/210) of PCT/JP2017/028741," dated Oct. 10, 2017, with English translation thereof, pp. 1-5.

* cited by examiner

*Primary Examiner* — Michael F Pepitone
(74) *Attorney, Agent, or Firm* — JCIPRNET

(57) ABSTRACT

The disclosure provides an anti-adhesive composition for unvulcanized rubbers which enables a reduction in anti-adhesive-induced dusting, can exhibit high anti-adhesive properties even in a small application amount, and brings about high slipperiness. The anti-adhesive composition for unvulcanized rubbers includes (A) a water-soluble polymer, (B) particles of a water-insoluble organic polymer, (C) a metal soap, (D) a surfactant and water. The anti-adhesive composition for unvulcanized rubbers includes, with respect to the whole mass of the components excluding the water, 30 mass % or more the component (A), 1-20 mass % the component (B), 20-50 mass % the component (C), and 10-20 mass % the component (D).

4 Claims, No Drawings

ANTI-ADHESIVE COMPOSITION FOR UNVULCANIZED RUBBER

CROSS-REFERENCE TO RELATED APPLICATIONS

This application is a continuation application of International Application number PCT/JP2017/028741, filed on Aug. 8, 2017, which claims the priority benefit of Japan Patent Application No. 2016-156833, filed on Aug. 9, 2016. The entirety of each of the above-mentioned patent applications is hereby incorporated by reference herein and made a part of this specification.

BACKGROUND

Technical Field

The disclosure relates to an anti-adhesive composition for unvulcanized rubber.

Description of Related Art

In places where rubber is produced and processed, in order to prevent adherence of rubber (for example, unvulcanized rubber), an anti-adhesive agent is adhered to a surface of rubber.

Anti-adhesive agents for rubber including an inorganic powder as a main component are widely used as an anti-adhesive agent for rubber. Generally, these agents in the form of an aqueous dispersion can be adhered to a surface of rubber for use (Japanese Patent Application Laid-Open No. S50-149770 (JP-A No. S50-149770) and Japanese Patent Application Laid-Open No. 2013-001720 (JP-A No. 2013-001720)). In order for anti-adhesive agents for rubber to allow favorable anti-adhesive properties to be exhibited, it is important to improve adhesion (opacifying properties) to a surface of rubber so that they can be uniformly adhered to a surface of rubber. Therefore, various studies have been made in order to improve the adhesion of an anti-adhesive agent for rubber. For example, in JP-A No. S50-149770 and JP-A No. 2013-001720, in order to improve an anti-adhesive effect, an inorganic powder such as bentonite is used in combination with an active agent or latex. In addition, various anti-adhesive agents using a water-soluble polymer or the like have been proposed in order to reduce dust derived from an inorganic powder. For example, in Japanese Patent Application Laid-Open No. S62-032127 (JP-A No. S62-032127) and Japanese Patent Application Laid-Open No. 2009-161667 (JP-A No. 2009-161667), a water-soluble polymer (sodium alginate, CMC, sodium polyacrylate, PVA, or the like), a water-soluble polysaccharide (xanthan gum), and the like are mixed together to increase the viscosity of an aqueous dispersion of an anti-adhesive agent, and adhesion of the anti-adhesive agent to a surface of rubber is improved. In addition, in Japanese Patent Application Laid-Open No. 2001-348495 (JP-A No. 2001-348495), a liquid anti-adhesive agent that is sufficient with respect to both anti-adhesive properties and lubricity has been proposed.

There is a risk of dust derived from an anti-adhesive agent deteriorating a work environment when the anti-adhesive agent is applied to unvulcanized rubber and after a coating treatment. In particular, dust derived from an inorganic powder may cause contamination not only in a work environment but also in a factory.

On the other hand, in an anti-adhesive agent containing no inorganic powder, the lubricity necessary for an anti-adhesive agent tends to be insufficient. In JP-A No. 2001-348495, as described above, a liquid anti-adhesive agent that is sufficient with respect to both anti-adhesive properties and lubricity has been proposed, but an anti-adhesive agent having higher lubricity is necessary.

In addition, when a large amount of an anti-adhesive agent adhered to unvulcanized rubber is required, this may also result in contamination in a work environment, contamination in a factory, and the like.

SUMMARY

Here, the disclosure provides an anti-adhesive composition for unvulcanized rubber through which it is possible to reduce generation of dust derived from an anti-adhesive agent, it is possible for strong anti-adhesive properties to be exhibited with a small adhesion amount, and it is possible to improve lubricity. Here, lubricity in the disclosure is defined as a property of lowering frictional resistance occurring in a contact surface when unvulcanized rubber to which an anti-adhesive composition for unvulcanized rubber is applied comes in contact with another rubber, metal, or the like.

An anti-adhesive composition for unvulcanized rubber of the disclosure includes the following components (A) to (D) and water:
(A) water-soluble polymer,
(B) water-insoluble organic polymer particles,
(C) metallic soap, and
(D) surfactant.

The anti-adhesive composition for unvulcanized rubber includes, with respect to a total mass of components other than water, 30 mass % or more of the component (A), 1 to 20 mass % of the component (B), 20 to 50 mass % of the following component (C), and 10 to 20 mass % of the following component (D).

DESCRIPTION OF THE EMBODIMENTS

The disclosure will be described below in further detail with reference to examples. However, the disclosure is not limited to the following description.

The anti-adhesive composition for unvulcanized rubber of the disclosure may include, for example, 1 to 50 mass % of the component (B) with respect to a total mass of the components (B) and (C).

In the anti-adhesive composition for unvulcanized rubber of the disclosure, for example, the component (A) may be a water-soluble polymer having a viscosity of 3 to 300 mPa·s at 25° C. in an aqueous solution containing 2 mass % of the component (A).

Specific examples of the disclosure will be described below in further detail.

[1. Anti-Adhesive Composition for Unvulcanized Rubber]

As described above, the anti-adhesive composition for unvulcanized rubber of the disclosure includes the following components (A) to (D) and water:
(A) water-soluble polymer
(B) water-insoluble organic polymer particles
(C) metallic soap, and
(D) surfactant.

The anti-adhesive composition for unvulcanized rubber includes, with respect to a total mass of components other than water, 30 mass % or more of the following component (A), 1 to 20 mass % of the following component (B), 20 to 50 mass % of the following component (C), and 10 to 20 mass % of the following component (D).

The anti-adhesive composition for unvulcanized rubber of the disclosure includes the components (A) to (D) in the above contents. Thus, even if the amount of an inorganic powder from which dust is derived is reduced or an inorganic powder is not included, since lubricity is improved and strong anti-adhesive properties can be exhibited with a small adhesion amount, the amount of dust can be reduced. When the component (A) the water-soluble polymer, (C) the metallic soap, and (D) the surfactant are included in the above contents, for example, even if no inorganic powder is included, strong anti-adhesive properties can be exhibited with a small adhesion amount, and when the component (B), the water-insoluble organic polymer particles, and the (C) metallic soap are included in the above contents, for example, high lubricity can be exhibited without including an inorganic powder.

Here, a method of measuring anti-adhesive properties and lubricity is not particularly limited, and they can be measured according to, for example, methods described in examples to be described below. In addition, in the disclosure, an "adhesion amount" of an anti-adhesive composition for unvulcanized rubber is an amount of all components other than water in an anti-adhesive composition for unvulcanized rubber, which are adhered to a surface of unvulcanized rubber.

Components of the anti-adhesive composition for unvulcanized rubber of the disclosure will be described below.

(1) Component (A): Water-Soluble Polymer

In the anti-adhesive composition for unvulcanized rubber of the disclosure, the component (A), that is, a water-soluble polymer (hereinafter referred to as a "water-soluble polymer (A)" in some cases), is a polymer compound which is put into water or put into water and then heated and thus can disperse or dissolve in the anti-adhesive composition for unvulcanized rubber of the disclosure. Therefore, for example, a coating effect on unvulcanized rubber is obtained and an anti-adhesive effect is obtained. As described above, regarding a content of the water-soluble polymer (A) with respect to a total mass of components other than water, the lower limit is 30 mass % or more, for example, it may be 40 mass % or more or 50 mass % or more, and the upper limit is not particularly limited, but for example, may be 60 mass % or less, 40 mass % or less, or 35 mass % or less. When a content of the water-soluble polymer (A) is 30 mass % or more, for example, a coating effect on unvulcanized rubber is obtained. In addition, when the water-soluble polymer (A) is included in an amount of 40 mass % or less, the anti-adhesive composition for unvulcanized rubber of the disclosure has, for example, excellent drying properties, and can be dried quickly.

As described above, the water-soluble polymer (A) may be a water-soluble polymer having a viscosity of 3 to 300 mPa·s at 25° C. in an aqueous solution containing 2 mass % of the water-soluble polymer (A). When a water-soluble polymer having a viscosity of 3 mPa·s or more at 25° C. in a 2 mass % aqueous solution is used, for example, an effect of increasing an amount of adhesion to unvulcanized rubber is obtained. When a water-soluble polymer having a viscosity of 300 mPa·s or less in a 2 mass % aqueous solution is used, for example, an effect of having excellent drying properties is obtained. The viscosity of a 2 mass % aqueous solution may be, for example, 10 mPa·s or more or 100 mPa·s or more, or may be 200 mPa·s or less or 100 mPa·s or less.

The water-soluble polymer (A) is not particularly limited, and may be, for example, a polymer having a lower limit of solubility with respect to 100 g of water at 25° C. which is 1 g or more, 10 g or more, or 50 g or more. In addition, in the disclosure, the "polymer" is not particularly limited, and may be a polymer having a lower limit of a mass average molecular weight of for example, 1,000 or more, 5,000 or more, or 10,000 or more, and an upper limit of a mass average molecular weight thereof is not particularly limited, and may be, for example, 500,000 or less.

The type of the water-soluble polymer (A) is not particularly limited, and one type may be used alone or a plurality of types may be used in combination. The water-soluble polymer (A) may be, for example, a synthetic water-soluble polymer or a natural water-soluble polymer. The "synthetic water-soluble polymer" may be, for example, obtained by artificially synthesizing a polymer having a chemical structure that is not found in nature or artificially synthesizing a polymer having a chemical structure found in nature. In addition, the "natural water-soluble polymer" may be, for example, obtained by extracting or generating a polymer having a chemical structure found in nature from nature. The synthetic water-soluble polymer is not particularly limited, and examples thereof include carboxymethyl cellulose (CMC), polyacrylic acid, sodium polyacrylate, polyacrylamide, polyvinyl alcohol (PVA), polyvinylpyrrolidone, polyethylene glycol, polyethylene oxide, a water-soluble urethane resin, a water-soluble melamine resin, a water-soluble epoxy resin, a water-soluble butadiene resin, a water-soluble phenolic resin, and the like. The natural water-soluble polymer is not particularly limited, and examples thereof include proteins, xanthan gum, guar gum, welan gum, locust bean gum, diutan gum, tamarind gum, tamarind seed gum, tragacanth gum, gum arabic, carrageenan, rhamsan gum, succinoglycan, tara gum, gellan gum, karaya gum, pectin, alginic acid derivatives, cellulose ethers, and the like.

(2) Component (B): Water-Insoluble Organic Polymer Particles

The component (B), that is, water-insoluble organic polymer particles (hereinafter referred to as "water-insoluble organic polymer particles (B)"), is an organic polymer compound which is different from the water-soluble polymer of the component (A), and even if it is put into water or it is put into water and then heated, it does not disperse or dissolve in the anti-adhesive composition for unvulcanized rubber of the disclosure. Since the component (B) does not disperse or dissolve in the anti-adhesive composition for unvulcanized rubber of the disclosure, a desired particle form is maintained and irregularities are formed and remain on a surface of rubber, and thus, for example, high lubricity is obtained. As described above, a content of insoluble organic polymer particles (B) is 1 to 20 mass % or more with respect to a total mass of components other than water, the lower limit thereof may be, for example, 2 mass % or more or 3 mass % or more, and the upper limit thereof may be, for example, 15 mass % or less or 10 mass % or less. When a content of the water-insoluble organic polymer particles (B) is 1 mass % or more, for example, high lubricity is obtained. In addition, when a content of the water-insoluble organic polymer particles (B) is 20 mass % or less, for example, in the anti-adhesive composition for unvulcanized rubber after drying, an amount of dispersal of dust derived from an anti-adhesive agent is small and the amount of dust can be reduced.

In addition, a content of the component (B) with respect to a total mass of the components (A) and (B) may be, for example, 1 to 50 mass %, and may be, for example, 1 to 45 mass % or 2 to 40 mass %. When a content of the component (B) with respect to a total mass of the components (A) and (B) is 1 mass % or more, for example, high lubricity is obtained. In addition, when a content of the component (B) with respect to a total mass of the components (A) and (B) is 50 mass % or less, for example, an effect of reducing generation of dust derived from an anti-adhesive agent is obtained.

In the anti-adhesive composition for unvulcanized rubber of the disclosure, compared to the related art, for example, JP-A No. 2009-161667, and JP-A No. 2001-348495), even if a content of the water-insoluble organic polymer particles (B) is small, strong anti-adhesive properties and high lubricity can be exhibited. Thus, when a content of the water-insoluble organic polymer particles (B) is low, the amount of dust can also be reduced.

In addition, as described above, a content of the component (B) with respect to a total mass of the components (B) and (C) may be, for example, 1 to 50 mass %, and may be, for example, 3 to 40 mass %, 5 to 20 mass % or 5 to 10 mass %. When a content of the component (B) with respect to a total mass of the components (B) and (C) is 1 mass % or more, for example, high lubricity is obtained. In addition, when a content of the component (B) with respect to a total mass of the components (B) and (C) is 50 mass % or less, for example, an effect of reducing generation of dust derived from an anti-adhesive agent is obtained.

The mass average molecular weight of the "polymer" in the disclosure is not particularly limited, and, for example, may be as described above.

The type of the water-insoluble organic polymer particles (B) is not particularly limited, and one type may be used alone or a plurality of types may be used in combination. The water-insoluble organic polymer particles (B) may be, for example, a polyester, a polyolefin, a poly(meth)acrylic acid, a poly(meth)acrylic acid alkyl ester, a polycarbonate, or the like. Here, in the disclosure, (meth)acrylic acid means at least one of acrylic acid and methacrylic acid. Examples of the polyester include polyethylene terephthalate (PET), polybutylene terephthalate (PBT), polyethylene naphthalate (PEN), and polytributylene terephthalate (PTT). Examples of the polyolefin include polyethylene (PE) and polypropylene (PP). Examples of the poly(meth)acrylic acid alkyl ester include polymethyl methacrylate, polymethyl methacrylate, polybutyl methacrylate, lauryl polymethacrylate, 2-ethylhexyl polymethacrylate, and stearyl polymethacrylate. The polycarbonate is a carbonate ester polymer having a carbonate group —O—(C=O)—O—. In addition, the polymer constituting the water-insoluble organic polymer particles (B) may be a crosslinked polymer.

In addition, a volume average particle size of the water-insoluble organic polymer particles (B) is not particularly limited, and may be, for example, 1 to 40 µm, 5 to 30 µm, or 5 to 20 µm. When the volume average particle size is 1 µm or more, for example, high lubricity is obtained. In addition, when the volume average particle size is 40 µm or less, for example, an effect of increasing a proportion of insoluble organic polymer remaining on a surface of rubber is obtained.

(3) Component (C): Metallic Soap

As described above, in the anti-adhesive composition for unvulcanized rubber of the disclosure, a content of the component (C), that is, a metallic soap (hereinafter referred to as a "metallic soap (C)" in some cases) with respect to a total mass of components other than water is 20 to 50 mass %, and the lower limit thereof may be, for example, 25 mass % or more or 30 mass % or more, and the upper limit may be, for example, 45 mass % or less or 40 mass % or less. When a content of the metallic soap (C) is 20 mass % or more, for example, high lubricity and strong anti-adhesive properties are obtained. In addition, when a content of the metallic soap (C) is 50 mass % or less, for example, an effect of reducing dust is obtained.

The type of the metallic soap (C) is not particularly limited and one type may be used alone or a plurality of types may be used in combination. The metallic soap (C) is, for example, a salt other than sodium salts and potassium salts among metal salts of higher fatty acids or derivatives thereof, and is, for example, a salt other than alkali metal salts among these metal salts. The higher fatty acid is, for example, a fatty acid having 12 or more carbon atoms, and the upper limit value of the number of carbon atoms is not particularly limited and may be, for example, 20 or less. A derivative of the higher fatty acid may be, for example, a higher fatty acid substituted with one or a plurality of substituents. Specific examples of the metallic soap (C) include calcium caprylate, zinc caprylate, magnesium caprylate, calcium caprate, zinc caprate, magnesium caprate, calcium laurate, zinc laurate, magnesium laurate, calcium myristate, zinc myristate, magnesium myristate, calcium palmitate, zinc palmitate, magnesium palmitate, calcium stearate, zinc stearate, magnesium stearate, aluminum stearate, aluminum trioctadecanoate, aluminum dioctadecanoate, aluminum monooctadecanoate, calcium octadecanoate, zinc octadecanoate, magnesium octadecanoate, calcium oleate, zinc oleate, magnesium oleate, calcium behenate, zinc behenate, magnesium behenate, calcium 12-hydroxystearate, zinc 12-hydroxystearate, magnesium 12-hydroxystearate, calcium 14-octadecanoate, zinc 14-octadecanoate, magnesium 14-octadecanoate, calcium 8-octadecanoate, zinc 8-octadecanoate, magnesium 8-octadecanoate, calcium 6-octadecanoate, zinc 6-octadecanoate, magnesium 6-octadecanoate, calcium coconut fatty acid, coconut fatty acid zinc, coconut fatty acid magnesium, palm oil fatty acid calcium, palm oil fatty acid zinc, palm oil fatty acid magnesium, palm kernel oil fatty acid calcium, palm kernel oil fatty acid zinc, palm kernel oil fatty acid magnesium, tallow fatty acid calcium, tallow fatty acid zinc, tallow fatty acid magnesium, castor oil fatty acid calcium, castor oil fatty acid zinc, and castor oil fatty acid magnesium.

(4) Component (D): Surfactant

As described above, in the anti-adhesive composition for unvulcanized rubber of the disclosure, a content of the component (D), that is, a surfactant (hereinafter referred to as a "surfactant (D)" in some cases) with respect to a total mass of components other than water is 10 to 20 mass %, and may be, for example, 13 mass % or more or 15 mass % or more, and may be, for example, 18 mass % or less or 16 mass % or less. When a content of the surfactant (D) is 10 mass % or more, for example, strong anti-adhesive properties and high wettability in unvulcanized rubber are obtained. In addition, when a content of the surfactant (D) is 20 mass % or less, for example, an effect of having excellent drying properties is obtained. Here, a method of measuring adhesion to unvulcanized rubber is not particularly limited, and it can be measured by, for example, a measurement method described in examples to be described below.

The surfactant (D) allows, for example, the anti-adhesive composition for unvulcanized rubber of the disclosure to disperse in water, to have better wettability, and to have better adhesion to unvulcanized rubber. The surfactant (D) is not particularly limited, and one type may be used alone or a plurality of types may be used in combination, and may be, for example, at least one of an anionic surfactant and a nonionic surfactant. The anionic surfactant is not particularly limited, and examples thereof include the following (i) to (iv). In addition, the nonionic surfactant is not particularly limited, and examples thereof include the following (v).

(i) A carboxylic acid type anionic surfactant such as a higher fatty acid salt, an alkyl ether carboxylate, a polyoxyalkylene ether carboxylate, an alkyl (or alkenyl) amido ether carboxylate, and an acylaminocarboxylate (ii) A sulfate ester type anionic surfactant such as a higher alcohol sulfate ester salt, a polyoxyalkylene higher alcohol sulfate ester salt, an alkylphenyl ether sulfate ester salt, a polyoxyalkylene alkylphenyl ether sulfate ester salt, and a glycerin fatty acid ester monosulfate ester salt (iii) A sulfonic acid type anionic surfactant such as an alkanesulfonate, an α-olefin sulfonate, a linear alkyl benzene sulfonate, an α-sulfofatty acid ester salt, and a dialkyl sulfosuccinate (iv) A phosphate ester type anionic surfactant such as an alkyl phosphate ester salt, a polyoxyalkylene alkyl phosphate ester salt, a polyoxyalkylene alkyl phenyl phosphate ester salt, and a glycerin fatty acid ester monophosphate ester salt (v) A polyoxyalkylene alkyl ether type nonionic surfactant A counter ion of the anionic surfactant is not particularly limited, but ions of an alkali metal such as sodium and potassium and an alkanolamine such as monoethanolamine and diethanolamine are preferable. Regarding the ions, one type may be used alone or a plurality of types may be used in combination.

In order to obtain an anti-adhesive composition having excellent wettability with respect to a surface of unvulcanized rubber, the anionic surfactant is preferably a dialkyl sulfosuccinate and more preferably a dioctyl sulfosuccinate Na salt.

The nonionic surfactant is not particularly limited, and in the disclosure, for example, a nonionic surfactant represented by the following formula (1) can be used. The nonionic surfactant of the following formula (1), together with an anionic surfactant, is presumed to have an action of lowering a surface tension of an anti-adhesive composition with respect to a surface of unvulcanized rubber and effectively increasing adhesion of an anti-adhesive composition to a surface of unvulcanized rubber. However, this presumption does not limit the disclosure at all.

$$RO\text{-}(AO)_n\text{-}H \quad (1)$$

In Formula (1), R represents an aliphatic hydrocarbon group having 8 to 18 carbon atoms. The aliphatic hydrocarbon group may be linear or branched. In addition, it may be saturated or unsaturated. The number of carbon atoms of R is preferably 12 to 16 and more preferably 12 to 13 in order to obtain excellent dispersibility of the component (A).

AO represents an oxyalkylene group having 2 to 4 carbon atoms, and n represents an average addition mole number of AO.

n is, for example, 1 to 30 or 1 to 25. Specifically, in order to prevent surface activity from decreasing and the dispersibility of the component (A) from decreasing, n is 1 or more (that is, it is not 0). In addition, in order to prevent decrease in adhesion due to too high hydrophilicity, n is 30 or less, or 25 or less. It is presumed that, when n is in a range of 1 to 30 or in a range of 1 to 25, the dispersibility of the component (A) is further improved and even if hydrophobicity of a surface of unvulcanized rubber is high, sufficient viscoelasticity is provided for dry coating of an anti-adhesive composition for unvulcanized rubber, and thus adhesion is improved. However, this presumption does not limit the disclosure at all.

The oxyalkylene group having 2 to 4 carbon atoms is, for example, a polymerization unit obtained by adding an alkylene oxide having 2 to 4 carbon atoms (formed by addition polymerization). Specific examples of the oxyalkylene group having 2 to 4 carbon atoms include an oxyethylene group (EO) to which ethylene oxide is added, an oxypropylene group (PO) to which propylene oxide is added, and an oxybutylene group (BO) to which butylene oxide is added. $(AO)_n$ has at least an oxyethylene group in its structure. When $(AO)_n$ includes a plurality of types of oxyethylene group (EO), oxypropylene group (PO), and oxybutylene group (BO), these groups may be arranged in a block form or arranged at random. A preferable $(AO)_n$ is composed of only oxyethylene groups (EO) in order to obtain excellent balance between hydrophilicity and hydrophobicity.

A specific example of the nonionic surfactant is not particularly limited, and examples thereof include lauryl ether EO, cetyl ether EO, stearyl ether EO, oleyl ether EO, decyl ether EO, isodecyl ether EO, tridecyl ether EO, secondary alcohol ether EO, synthetic alcohol ether EOPO, lauryl ether EOPO, decyl ether EOPO, isodecyl ether EOPO, tridecyl ether EOPO, and stearyl ether EOPO.

(5) Water

In the anti-adhesive composition for unvulcanized rubber of the disclosure, a content of water is not particularly limited, and with respect to a total mass of the anti-adhesive composition for unvulcanized rubber, it may be, for example, 50 mass % or more, 60 mass % or more, or 70 mass % or more, and may be, for example, 90 mass % or less, 85 mass % or less, or 80 mass % or less.

For example, water imparts fluidity to the anti-adhesive composition for unvulcanized rubber of the disclosure and makes it easier to handle. In addition, the water is not particularly limited, and may be, for example, tap water, distilled water, or deionized water.

(6) Optional Components

The anti-adhesive composition for unvulcanized rubber of the disclosure may or may not include optional components other than the components (A) to (D) and water. For example, additives such as an antifoaming agent, a wettability auxiliary agent, a viscosity auxiliary agent, and a foreign matter reducing auxiliary agent may be added as optional components as necessary to the anti-adhesive composition for unvulcanized rubber of the disclosure.

The antifoaming agent is not particularly limited, and examples thereof include a fat or oil type antifoaming agent such as castor oil, sesame oil, linseed oil, and animal and vegetable oils; a fatty acid ester type antifoaming agent such as isoamyl stearate, distearyl succinate, ethylene glycol distearate, and butyl stearate; an alcohol type antifoaming agent such as polyoxyalkylene monohydric alcohol di-t-amylphenoxyethanol, 3-heptanol, and 2-ethylhexanol; an ether type antifoaming agent such as di-t-amylphenoxyethanol 3-heptyl cellosolve nonyl cellosolve 3-heptyl carbitol; a phosphate ester type antifoaming agent such as tributyl phosphate, and tris(butoxyethyl) phosphate; an amine type antifoaming agent such as diamylamine; an amide type antifoaming agent such as polyalkylene amide, and acylate polyamine; mineral oil; silicone oil; and the like. One type of the antifoaming agent may be used alone or a plurality of types thereof may be used in combination.

The wettability auxiliary agent is not particularly limited, and examples thereof include alcohols. More specifically, for example, methanol, ethanol, hexanol, glycerin, 1,3-butanediol, propylene glycol, dipropylene glycol, pentylene glycol, hexylene glycol, polyethylene glycol, sorbitol, maltitol, sucrose, erythritol, xylitol, polyethylene glycol, polypropylene glycol, and ethylene oxide or propylene oxide adducts of polyhydric alcohols may be exemplified. One type of the wettability auxiliary agent may be used alone or a plurality of types thereof may be used in combination.

[2. Method of Producing Anti-Adhesive Composition for Unvulcanized Rubber]

A method of producing an anti-adhesive composition for unvulcanized rubber of the disclosure is not particularly limited. For example, all components (the components (A) to (D) and water, and optional components added as necessary) of an anti-adhesive agent for unvulcanized rubber can be mixed together for production. A device used for mixing is not particularly limited, and, for example, a device having a configuration in which a stirring blade is provided in a container can be used. Specifically, for example, a powder mixer configured to perform shaking and stirring or stirring such as a ribbon type mixer and a vertical screw type mixer may be exemplified.

[3. Method of Using Anti-Adhesive Composition for Unvulcanized Rubber]

A method of using an anti-adhesive composition for unvulcanized rubber of the disclosure is not particularly limited, and, for example, it may be the same as or similar to a general method of using an anti-adhesive composition for unvulcanized rubber. The method of using an anti-adhesive composition for unvulcanized rubber of the disclosure is specifically, for example, as follows, but the method is not limited thereto.

An anti-adhesive treatment method of unvulcanized rubber using an anti-adhesive composition for unvulcanized rubber of the disclosure includes, for example, an anti-adhesive treatment process in which an anti-adhesive composition for unvulcanized rubber of the disclosure is adhered to a surface of unvulcanized rubber and subjected to an anti-adhesive treatment. Adhesion to a surface of unvulcanized rubber can be performed by, for example, a wet method to be described below. Even if the unvulcanized rubber subjected to the anti-adhesive treatment (on which the anti-adhesive treatment is performed) in this manner is, for example, stored in a stacked or folded state, pieces of unvulcanized rubber do not adhere to each other. In addition, such an anti-adhesive treatment method of unvulcanized rubber can be, for example, a method of producing unvulcanized rubber subjected to an anti-adhesive treatment.

The anti-adhesive composition for unvulcanized rubber of the disclosure may be used without change, but it may be used in the form of a water-diluted solution (aqueous dispersion) in which the anti-adhesive composition is diluted in water. A concentration of the anti-adhesive composition for unvulcanized rubber of the disclosure adhered to a surface of unvulcanized rubber is not particularly limited, and with respect to a total mass of the anti-adhesive composition for unvulcanized rubber, a total mass of components other than water may be, for example, 0.5 mass % or more, 1 mass % or more, or 2 mass % or more, and may be, for example, 15 mass % or less, 10 mass % or less, or 5 mass % or less. When the concentration is not too high, for example, an effect of low dispersal properties and fast drying is obtained. When the concentration is not too low, for example, an effect of strong anti-adhesive properties and high lubricity is obtained. For example, even if the concentration of the anti-adhesive composition for unvulcanized rubber of the disclosure adhered to a rubber of unvulcanized surface is low, since strong anti-adhesive properties can be exhibited, strong anti-adhesive properties can be exhibited with a small adhesion amount. In addition, the viscosity during adhesion to a surface of unvulcanized rubber is not particularly limited, and may be, for example, 1 mPa·s or more, 5 mPa·s or more, or 10 mPa·s or more, and may be, for example, 30 mPa·s or less, 20 mPa·s or less, or 15 mPa·s or less. When the viscosity is not too high, for example, an effect of low dispersal properties and fast drying is obtained. When the viscosity is not too low, for example, an effect of strong anti-adhesive properties and high lubricity is obtained.

The anti-adhesive treatment process may be, for example, a process in which the anti-adhesive composition for unvulcanized rubber of the disclosure is adhered to a surface of the unvulcanized rubber, and additionally water is volatilized, and thus the anti-adhesive composition for unvulcanized rubber of the disclosure is adhered to a surface of the unvulcanized rubber. More specifically, the anti-adhesive treatment process preferably includes a procedure of adhering an anti-adhesive composition for unvulcanized rubber in which the anti-adhesive composition for unvulcanized rubber of the disclosure is adhered to a surface of unvulcanized rubber and a drying procedure in which the anti-adhesive composition for unvulcanized rubber on the surface of the unvulcanized rubber is dried and a coating is formed on a surface of unvulcanized rubber. Such an anti-adhesive treatment process is referred to as, for example, a wet method. The wet method is not particularly limited, and, for example, it can be performed in the same manner as in a general wet method of an anti-adhesive composition for unvulcanized rubber.

In the procedure of adhering an anti-adhesive composition for unvulcanized rubber, for example, the anti-adhesive composition for unvulcanized rubber is preferably adhered to unvulcanized rubber which is in a high temperature state (for example, about 80 to 150° C.) due to heat when it is molded into a sheet form or the like.

Examples of specific methods for the procedure of adhering an anti-adhesive composition for unvulcanized rubber include a method of spraying an anti-adhesive composition for unvulcanized rubber to unvulcanized rubber using a shower device and a dipping method in which unvulcanized rubber is immersed in a tank containing an anti-adhesive composition for unvulcanized rubber for a short time. In addition, a method of applying an anti-adhesive composition for unvulcanized rubber to unvulcanized rubber using a coating device and the like may be used, and such methods may be appropriately used in combination.

According to the anti-adhesive composition for unvulcanized rubber of the disclosure, as described above, it is possible to reduce dust, it is possible for strong anti-adhesive properties to be exhibited with a small adhesion amount, and it is possible to obtain high lubricity.

The type of rubber to which the anti-adhesive agent for unvulcanized rubber of the disclosure can be applied is not particularly limited, and any unvulcanized rubber may be used. Examples of types of rubber include rubber such as natural rubber (NR), butadiene rubber (BR), styrene butadiene rubber (SBR), IIR (butyl rubber), and EPDM (ethylene propylene rubber), and rubber in which a plurality of types thereof are mixed.

EXAMPLES

Next, examples of the disclosure will be described. However, the disclosure is not limited to the following examples.

Raw materials used in this example are as follows.

(A) Water-Soluble Polymer

A-1: polyvinyl alcohol (PVA), product name "JF-17L" commercially available from Japan VAM & Poval A-2: polyvinyl alcohol (PVA), product name "JP-24" commercially available from Japan VAM & Poval A-3: carboxymethyl cellulose (CMC), product name "CELLOGEN 6A" commercially available from DKS Co. Ltd.

A-4: carboxymethyl cellulose (CMC), product name "CELLOGEN PR" commercially available from DKS Co. Ltd.

(B) Water-Insoluble Organic Polymer Particles

B-1: crosslinked polymethyl methacrylate (average particle size of 5 μm), product name "TECHPOLYMER MBX-5" commercially available from Sekisui Plastics Co., Ltd.

B-2: crosslinked polymethyl methacrylate (average particle size of 12 μm), product name "TECHPOLYMER MBX-12" commercially available from Sekisui Plastics Co., Ltd.

B-3: crosslinked polymethyl methacrylate (average particle size of 20 μm), product name "TECHPOLYMER MBX-20" commercially available from Sekisui Plastics Co., Ltd.

B-4: crosslinked polymethyl methacrylate (average particle size of 30 μm), product name "TECHPOLYMER MBX-30" commercially available from Sekisui Plastics Co., Ltd.

B-5: crosslinked polymethacrylic acid butyl (average particle size of 12 μm), product name "TECHPOLYMER BM30X-12" commercially available from Sekisui Plastics Co., Ltd.

(C) Metallic Soap

C-1: calcium stearate, product name "CALCIUM STEARATE" commercially available from NOF Corporation C-2: zinc stearate, product name "ZINC STEARATE" commercially available from NOF Corporation (D) Surfactant D-1: dioctyl sulfosuccinate sodium salt, product name "AIR ROLL CT-1ET" commercially available from TOHO Chemical Industry Co., Ltd.

D-2: polyoxyethylene polyoxypropylene tridecyl ether (average EO addition mole number of 2 mol, average PO addition mole number of 1 mol), product name "FINE SURF TDP-0201R" commercially available from Aoki Oil Industrial Co., Ltd.

D-3: polyoxyethylene lauryl ether (EO average addition mole number of 2.2 mol), product name "FINE SURF EL-1502.2" commercially available from Aoki Oil Industrial Co., Ltd.

[Measurement of Viscosity of Water-Soluble Polymer (A)]

An aqueous solution containing a water-soluble polymer (A) adjusted to 2 mass % was put into a 200 mL sample bottle and adjusted to 25° C., and a viscosity thereof was then measured using a B type viscometer (commercially available from Toki Sangyo Co., Ltd.). The viscosity was measured using a rotor No. 1 or 2 at a rotational speed of 30 rpm after 30 seconds.

[1. Production of Anti-Adhesive Composition for Unvulcanized Rubber]

Anti-adhesive compositions for unvulcanized rubber of Examples 1 to 15 and Comparative Examples 1 to 6 were produced as follows.

Example 1

5 mass % of A-1 (a viscosity of a 2 mass % aqueous solution at 25° C. of 5 mPa·s), 1 mass % of B-1, 5 mass % of C-1, 0.5 mass % of D-1, 1.0 mass % of D-2, 1.0 mass % of D-3, and the rest of water (86.5 mass %) were prepared and all these components were mixed (blended) together to produce an anti-adhesive composition for unvulcanized rubber. In addition, in this example, the "average particle size" represents a volume average particle size. This similarly applies to the following examples and comparative examples.

Example 2

An anti-adhesive composition for unvulcanized rubber was produced in the same manner as in Example 1 except that B-2 was used in place of the water-insoluble organic polymer particles (B).

Example 3

An anti-adhesive composition for unvulcanized rubber was produced in the same manner as in Example 1 except that B-3 was used in place of the water-insoluble organic polymer particles (B).

Example 4

An anti-adhesive composition for unvulcanized rubber was produced in the same manner as in Example 3 except that an amount of B-3 added was changed to 0.2 mass % and an amount of C-1 added was changed to 6 mass %.

Example 5

An anti-adhesive composition for unvulcanized rubber was produced in the same manner as in Example 3 except that an amount of B-3 added was changed to 1.4 mass %.

Example 6

An anti-adhesive composition for unvulcanized rubber was produced in the same manner as in Example 3 except that an amount of C-1 added was changed to 4.7 mass %.

Example 7

An anti-adhesive composition for unvulcanized rubber was produced in the same manner as in Example 3 except that an amount of C-1 added was changed to 6.5 mass %.

Example 8

An anti-adhesive composition for unvulcanized rubber was produced in the same manner as in Example 3 except that an amount of D-1 added was changed to 0.3 mass %, an amount of D-2 added was changed to 0.5 mass %, and an amount of D-3 added was changed to 0.5 mass %.

Example 9

An anti-adhesive composition for unvulcanized rubber was produced in the same manner as in Example 3 except that an amount of D-2 added was changed to 1.1 mass % and an amount of D-3 added was changed to 1.1 mass %.

Example 10

An anti-adhesive composition for unvulcanized rubber was produced in the same manner as in Example 1 except that B-4 was used in place of the water-insoluble organic polymer particles (B).

Example 11

An anti-adhesive composition for unvulcanized rubber was produced in the same manner as in Example 1 except that B-5 was used in place of the water-insoluble organic polymer particles (B).

Example 12

An anti-adhesive composition for unvulcanized rubber was produced in the same manner as in Example 1 except that A-2 (a viscosity of a 2 mass % aqueous solution at 25° C. of 8 mPa·s) was used in place of the water-soluble polymer (A).

Example 13

An anti-adhesive composition for unvulcanized rubber was produced in the same manner as in Example 1 except that A-3 (a viscosity of a 2 mass % aqueous solution at 25° C. of 8 mPa·s) was used in place of the water-soluble polymer (A).

Example 14

An anti-adhesive composition for unvulcanized rubber was produced in the same manner as in Example 1 except that A-4 (a viscosity of a 2 mass % aqueous solution at 25° C. of 110 mPa·s) was used in place of the water-soluble polymer (A).

Example 15

An anti-adhesive composition for unvulcanized rubber was produced in the same manner as in Example 14 except that C-2 was used in place of the metallic soap (C).

Comparative Example 1

An anti-adhesive composition for unvulcanized rubber was produced in the same manner as in Example 3 except that, instead of adding the water-soluble polymer (A), the same mass of water was additionally added.

Comparative Example 2

An anti-adhesive composition for unvulcanized rubber was produced in the same manner as in Example 3 except that, instead of adding the metallic soap (C), the same mass of water was additionally added.

Comparative Example 3

An anti-adhesive composition for unvulcanized rubber was produced in the same manner as in Example 1 except that, instead of adding the water-insoluble organic polymer particles (B), the same mass of water was additionally added.

Comparative Example 4

An anti-adhesive composition for unvulcanized rubber was produced in the same manner as in Example 3 except that, instead of adding the surfactant (D), the same mass of water was additionally added.

Comparative Example 5

An anti-adhesive composition for unvulcanized rubber was produced in the same manner as in Example 3 except that an amount of B-3 added was reduced to 0.1 mass % and water of the same mass as the reduced amount was additionally added.

Comparative Example 6

An anti-adhesive composition for unvulcanized rubber was produced in the same manner as in Example 3 except that an amount of B-3 added was increased by 10 mass %, and an amount of water added was reduced by the same mass as the increased amount thereof.

[2. Anti-Adhesive Treatment of Unvulcanized Rubber and Performance Evaluation]

As will be described below, an anti-adhesive treatment of unvulcanized rubber was performed using the anti-adhesive compositions for unvulcanized rubber of Examples 1 to 15 and Comparative Examples 1 to 6, and performance thereof was evaluated.

[Anti-Adhesive Treatment Method of Unvulcanized Rubber Sheet]

A unvulcanized rubber sheet (with a length of 15 cm, a width of 6 cm, and a thickness of 5 mm) was heated to 100° C., each of the anti-adhesive compositions for unvulcanized rubber of Examples 1 to 15 and Comparative Examples 1 to 6 was immersed in an aqueous dispersion (45° C.) obtained by dilution with water by a factor of 20, immediately taken out, and left alone and dried. In this manner, the unvulcanized rubber sheet was subjected to an anti-adhesive treatment. Here, in the aqueous dispersion (water-diluted solution), a total mass of components other than water was about 0.62 to 0.75 mass % of a total mass of the aqueous dispersion. This value was very low compared to when an anti-adhesive composition for unvulcanized rubber was generally used.

In addition, performance of the anti-adhesive compositions for unvulcanized rubber was evaluated as follows.

[Wettability (Adhesion)]

In the unvulcanized rubber sheet subjected to the anti-adhesive treatment, a wetted area (%) in a part other than a lower part (a part with a width of 0.5 cm from the lower end) was visually confirmed. When the wetted area (%) becomes larger, the wettability becomes more favorable, and the wetted area is ideally 100%. Here, the lower part (a part with a width of 0.5 cm from the lower end) of the unvulcanized rubber sheet was ignored because a liquid was able to accumulate thereon. A higher wettability indicates higher adhesion of the anti-adhesive agent for unvulcanized rubber. Here, in this example, evaluation criteria of the wettability were as follows.

Wettability ○: wetted area of 100%
Wettability Δ: wetted area of larger than 50% and less than 100% (for example, about 75%)
Wettability x: wetted area of 50% or less

[Drying Properties]

When the unvulcanized rubber sheet was subjected to an anti-adhesive treatment, a time from when the unvulcanized rubber sheet was taken out until a part other than a lower part (a part with a width of 0.5 cm from the lower end) was dried was visually measured. Here, a lower part (a part with a width of 0.5 cm from the lower end) of the unvulcanized rubber sheet was ignored because a liquid was able to accumulate thereon and it was difficult to dry. When a drying time is shorter, drying properties are excellent (favorable).

[Anti-Adhesive Properties of Rubber]

Two unvulcanized rubber sheets that were subjected to the anti-adhesive treatment and dried as described above were superimposed and a load of $1.0 \times 10^3$ kgw/m$^2$ ($9.8 \times 10^3$ Pa) was applied thereto, and the sheets were pressed in a thermostatic chamber at 60° C. for 24 hours. Then, the sheets were air-cooled to room temperature and pulled at a rate of 30 cm/min, and the peeling resistant force (N/cm) was measured. A lower peeling resistant force indicates excellent anti-adhesive properties.

[Lubricity]

The unvulcanized rubber sheet that was subjected to the anti-adhesive treatment and dried as described above was cut into a rectangle of 5×15 cm. This rubber was placed on a stainless steel plate, the plate was gradually inclined, and an inclination angle when it slid down was measured. A lower sliding down angle indicates excellent lubricity.

[Dispersal Properties]

The unvulcanized rubber sheet that was subjected to the anti-adhesive treatment and dried as described above was cut into a rectangle of 6×15 cm, and the mass thereof was measured. Front and back surfaces of the rubber were swept with a brush 10 times, and the mass thereof was then measured again. An amount of dust scattered was calculated according to a mass difference between before and after the sweeping operation. A smaller amount of dispersal indicates excellent dispersal properties.

In the following Tables 1 to 3, formulations of the anti-adhesive composition for unvulcanized rubber of Examples 1 to 15 and Comparative Examples 1 to 6 and the performance evaluation results are shown.

TABLE 1

| Components | | Examples | | | | | | | | |
|---|---|---|---|---|---|---|---|---|---|---|
| | | 1 | 2 | 3 | 4 | 5 | 6 | 7 | 8 | 9 |
| Water-soluble polymer | A-1 | 5 | 5 | 5 | 5 | 5 | 5 | 5 | 5 | 5 |
| | A-2 | | | | | | | | | |
| | A-3 | | | | | | | | | |
| | A-4 | | | | | | | | | |
| Water-insoluble organic polymer particles | B-1 | 1 | | | | | | | | |
| | B-2 | | 1 | | | | | | | |
| | B-3 | | | 1 | 0.2 | 3 | 1 | 1 | 1 | 1 |
| | B-4 | | | | | | | | | |
| | B-5 | | | | | | | | | |
| Metallic soap | C-1 | 5 | 5 | 5 | 6 | 5 | 4.7 | 6.5 | 5 | 5 |
| | C-2 | | | | | | | | | |
| Surfactant | D-1 | 0.5 | 0.5 | 0.5 | 0.5 | 0.5 | 0.5 | 0.5 | 0.3 | 0.5 |
| | D-2 | 1.0 | 1.0 | 1.0 | 1.0 | 1.0 | 1.0 | 1.0 | 0.5 | 1.1 |
| | D-3 | 1.0 | 1.0 | 1.0 | 1.0 | 1.0 | 1.0 | 1.0 | 0.5 | 1.1 |
| | Water | Rest | Rest | Rest | Rest | Rest | Rest | Rest | Rest | Rest |
| Evaluation | Wettability in rubber | ○ | ○ | ○ | ○ | ○ | ○ | ○ | ○ | ○ |
| | Drying properties (sec) | 25 | 26 | 26 | 27 | 27 | 26 | 28 | 26 | 25 |
| | Anti-adhesive properties of rubber (N/cm) | 1.1 | 1.1 | 1.1 | 1.0 | 1.1 | 1.2 | 1.0 | 1.2 | 1.1 |
| | Lubricity (degree) | 23 | 20 | 20 | 25 | 15 | 20 | 18 | 22 | 20 |
| | Dispersal properties (mg/100 cm$^2$) | 0.2 | 0.2 | 0.2 | 0.2 | 0.3 | 0.2 | 0.3 | 0.2 | 0.2 |

TABLE 2

| Components | | Examples | | | | | |
|---|---|---|---|---|---|---|---|
| | | 10 | 11 | 12 | 13 | 14 | 15 |
| Water-soluble polymer | A-1 | 5 | 5 | | | | |
| | A-2 | | | 5 | | | |
| | A-3 | | | | 5 | | |
| | A-4 | | | | | 5 | 5 |
| Water-insoluble organic polymer particles | B-1 | | | 1 | 1 | 1 | 1 |
| | B-2 | | | | | | |
| | B-3 | | | | | | |
| | B-4 | 1 | | | | | |
| | B-5 | | 1 | | | | |
| Metallic soap | C-1 | 5 | 5 | 5 | 5 | 5 | |
| | C-2 | | | | | | 5 |
| Surfactant | D-1 | 0.5 | 0.5 | 0.5 | 0.5 | 0.5 | 0.5 |
| | D-2 | 1.0 | 1.0 | 1.0 | 1.0 | 1.0 | 1.0 |
| | D-3 | 1.0 | 1.0 | 1.0 | 1.0 | 1.0 | 1.0 |
| | Water | Rest | Rest | Rest | Rest | Rest | Rest |
| Evaluation | Wettability in rubber | ○ | ○ | ○ | ○ | ○ | ○ |
| | Drying properties (sec) | 26 | 26 | 35 | 25 | 30 | 29 |
| | Anti-adhesive properties of rubber (N/cm) | 1.1 | 1.1 | 1.0 | 1.2 | 1.0 | 1.1 |

TABLE 2-continued

|  | | Examples | | | | | |
|---|---|---|---|---|---|---|---|
| Components | | 10 | 11 | 12 | 13 | 14 | 15 |
| Lubricity (degree) | | 18 | 20 | 20 | 22 | 18 | 20 |
| Dispersal properties (mg/100 cm$^2$) | | 0.3 | 0.2 | 0.2 | 0.2 | 0.2 | 0.3 |

TABLE 3

|  |  | Comparative Examples | | | | | |
|---|---|---|---|---|---|---|---|
| Components | | 1 | 2 | 3 | 4 | 5 | 6 |
| Water-soluble polymer | A-1 |  | 5 | 5 | 5 | 5 | 5 |
|  | A-5 |  |  |  |  |  |  |
| Water-insoluble organic polymer particles | B-1 |  |  |  |  |  |  |
|  | B-3 | 1 | 1 |  | 1 | 0.1 | 10 |
| Metallic soap | C-1 | 5 |  | 5 | 5 | 5 | 5 |
| Surfactant | D-1 | 0.5 | 0.5 | 0.5 |  | 0.5 | 0.5 |
|  | D-2 | 1.0 | 1.0 | 1.0 |  | 1.0 | 1.0 |
|  | D-3 | 1.0 | 1.0 | 1.0 |  | 1.0 | 1.0 |
|  | Water | Rest | Rest | Rest | Rest | Rest | Rest |
| Evaluation | Wettability in rubber | ◯ | ◯ | ◯ | X | ◯ | ◯ |
|  | Drying properties (sec) | 15 | 23 | 26 | 15 | 26 | 27 |
|  | Anti-adhesive properties of rubber (N/cm) | 3.0 | 2.5 | 1.1 | 3.5 | 1.1 | 1.1 |
|  | Lubricity (degree) | 20 | 35 | 40 | 18 | 38 | 15 |
|  | Dispersal properties (mg/100 cm$^2$) | 1.0 | 0.1 | 0.2 | 1.0 | 0.2 | 1.5 |

The anti-adhesive compositions for unvulcanized rubber of Examples 1 to 3 and 10 to 15 in Tables 1 and 2 included, with respect to a total mass of components other than water, about 37 mass % of the water-soluble polymer (A), about 7 mass % of the water-insoluble organic polymer particles (B), about 37 mass % of the metallic soap (C), and about 19 mass % of the surfactant (D). Example 4 included, with respect to a total mass of components other than water, about 36 mass % of the water-soluble polymer (A), about 1.5 mass % of the water-insoluble organic polymer particles (B), about 44 mass % of the metallic soap (C), and about 18 mass % of the surfactant (D). Example 5 included, with respect to a total mass of components other than water, about 36 mass % of the water-soluble polymer (A), about 10 mass % of the water-insoluble organic polymer particles (B), about 36 mass % of the metallic soap (C), and about 18 mass % of the surfactant (D). Example 6 included, with respect to a total mass of components other than water, about 38 mass % of the water-soluble polymer (A), about 8 mass % of the water-insoluble organic polymer particles (B), about 36 mass % of the metallic soap (C), and about 19 mass % of the surfactant (D). Example 7 included, with respect to a total mass of components other than water, about 33 mass % of the water-soluble polymer (A), about 7 mass % of the water-insoluble organic polymer particles (B), about 43 mass % of the metallic soap (C), and about 17 mass % of the surfactant (D). Example 8 included, with respect to a total mass of components other than water, about 41 mass % of the water-soluble polymer (A), about 8 mass % of the water-insoluble organic polymer particles (B), about 41 mass % of the metallic soap (C), and about 11 mass % of the surfactant (D). Example 9 included, with respect to a total mass of components other than water, about 37 mass % of the water-soluble polymer (A), about 7 mass % of the water-insoluble organic polymer particles (B), about 37 mass % of the metallic soap (C), and about 20 mass % of the surfactant (D). As shown in Tables 1 and 2, Examples 1 to 15 had both excellent anti-adhesive properties and lubricity. In addition, as described above, in the anti-adhesive compositions for unvulcanized rubber of Examples 1 to 9, a total mass of the aqueous dispersion (water-diluted solution) used for the anti-adhesive treatment components other than water was about 0.62 to 0.75 mass % of a total mass of the aqueous dispersion and this value was very low compared to when an anti-adhesive composition for unvulcanized rubber was generally used. That is, it was confirmed that the anti-adhesive compositions for unvulcanized rubber of Examples 1 to 15 were able to exhibit strong anti-adhesive properties with a small adhesion amount. In addition, according to dispersal properties evaluation results, it was confirmed that, in the anti-adhesive compositions for unvulcanized rubber of Examples 1 to 15, an amount of dust scattered was very low at 0.2 to 0.3 mg/100 cm$^2$, and the amount of dust was able to be reduced. In addition, the anti-adhesive compositions for unvulcanized rubber of Examples 1 to 15 had favorable wettability (adhesion) in rubber and drying properties. Here, as can be understood from comparison between Example 1 and Examples 12 to 14 in which the viscosity of the water-soluble polymer (A) was changed, the change in the viscosity of the water-soluble polymer (A) had no influence on evaluation results of wettability, drying properties, anti-adhesive properties, lubricity, and dispersal properties. In all of these examples, even if the viscosity of the water-soluble polymer (A) was changed, it was possible to reduce dust, it was possible for strong anti-adhesive properties to be exhibited with a small adhesion amount, and it was possible to increase the lubricity.

On the other hand, in Comparative Example 1 in which no water-soluble polymer (A) was added, anti-adhesive properties and dispersal properties were inferior to those of the examples. In Comparative Example 1 in which no metallic soap (C) was added, anti-adhesive properties and the lubricity were inferior to those of the examples. In Comparative Example 3 in which no water-insoluble organic polymer particles (B) were added, the lubricity was inferior to that of the examples. In Comparative Example 4 in which no surfactant (D) was added, dispersal properties were inferior to that of the examples (dust was abundant), and wettability in rubber was also inferior. In addition, in Comparative Example 5, with respect to a total mass of components other than water, a content of the water-insoluble organic polymer particles (B) was small at about 0.8 mass %, and as a result, the lubricity was inferior to that of the examples. In Comparative Example 6, with respect to a total mass of components other than water, a content of the water-insoluble organic polymer particles (B) was large at about 44 mass %, and as a result, dispersal properties were inferior to that of the examples (dust was abundant).

According to the disclosure, it is possible to provide an anti-adhesive composition for unvulcanized rubber through which it is possible to reduce generation of dust derived from an anti-adhesive agent, it is possible for strong anti-adhesive properties to be exhibited with a small adhesion amount, and it is possible to improve lubricity.

What is claimed is:

1. An anti-adhesive composition for unvulcanized rubber comprising:
    a component (A): water-soluble polymer;
    a component (B): water-insoluble organic polymer particles;
    a component (C): metallic soap;
    a component (D): surfactant; and
    water,
    wherein the anti-adhesive composition for unvulcanized rubber comprises, with respect to a total mass of components other than water,
    30 mass % or more of the component (A),
    1 to 20 mass % of the component (B),
    20 to 50 mass % of the component (C), and
    10 to 20 mass % of the component (D).

2. The anti-adhesive composition for unvulcanized rubber according to claim 1,
    wherein the component (B) is included in an amount of 1 to 50 mass % with respect to a total mass of the component (B) and the component (C).

3. The anti-adhesive composition for unvulcanized rubber according to claim 1,
    wherein the component (A) is a water-soluble polymer having a viscosity of 3 to 300 mPa·s at 25° C. in an aqueous solution containing 2 mass % of the component (A).

4. The anti-adhesive composition for unvulcanized rubber according to claim 2,
    wherein the component (A) is a water-soluble polymer having a viscosity of 3 to 300 mPa·s at 25° C. in an aqueous solution containing 2 mass % of the component (A).

* * * * *